US012515219B2

(12) United States Patent
Dennison et al.

(10) Patent No.: US 12,515,219 B2
(45) Date of Patent: Jan. 6, 2026

(54) MICROFLUIDIC CHIP AND ELECTRICAL INTERFACE FOR MICROCHIP ELECTROPHORESIS

(71) Applicant: Revvity Health Sciences, Inc., Waltham, MA (US)

(72) Inventors: Allen Curtis Dennison, Whitinsville, MA (US); Vladimir Krasheninin, Upton, MA (US); Stephen J. Allen, Sudbury, MA (US); Thomas Rawlins, Tyngsborough, MA (US); Richard Raymond Harazin, Lombard, IL (US); Michael W. Belobraydich, Plainfield, IL (US); Narendra Vaidya, Hudson, NH (US); Shreyas Milankumar Shah, Shrewsbury, MA (US); Thomas John Martiska, Boylston, MA (US)

(73) Assignee: REVVITY HEALTH SCIENCES, INC., Waltham, MA (US)

( * ) Notice: Subject to any disclaimer, the term of this patent is extended or adjusted under 35 U.S.C. 154(b) by 952 days.

(21) Appl. No.: 17/701,594

(22) Filed: Mar. 22, 2022

(65) Prior Publication Data

US 2023/0302445 A1 Sep. 28, 2023

(51) Int. Cl.
*B01L 3/00* (2006.01)

(52) U.S. Cl.
CPC ..... *B01L 3/502715* (2013.01); *B01L 2200/16* (2013.01); *B01L 2300/0819* (2013.01);
(Continued)

(58) Field of Classification Search
None
See application file for complete search history.

(56) References Cited

U.S. PATENT DOCUMENTS 6,319,476 B1 * 11/2001 Victor, Jr. ............... B01L 3/563 422/537
6,827,831 B1 * 12/2004 Chow ............... B01L 3/502715 204/453

(Continued)

FOREIGN PATENT DOCUMENTS

| | | | | |
|---|---|---|---|---|
| AU | 2004202695 | A | * | 7/2004 |
| CN | 104588136 | A | * | 5/2015 |

(Continued)

OTHER PUBLICATIONS

"International Search Report and Written Opinion for International Application No. PCT/US23064101 dated Aug. 9, 2023, 23 pages".

*Primary Examiner* — Jill A Warden
*Assistant Examiner* — Velvet Elizabeth Heron
(74) *Attorney, Agent, or Firm* — Myers Bigel, P.A.

(57) ABSTRACT

A microfluidic system may include a microfluidic chip having a non-conductive substrate and wells connected in common to a microfluidic channel within the non-conductive substrate. Each well may have a galvanic contact with a first portion at an upper surface of the sample well and a second portion that extends into the non-conductive substrate. A plurality of electrodes may be provided as part of an electrical interface, with each electrode configured to contact a respective galvanic contact of the microfluidic chip. The electrical interface may also include at least one shared power amplifier that is configured to generate a power signal (e.g., constant current, constant voltage, pulsed power signal). A selector may be configured to receive the generated power signal from the shared power amplifier and configured to select at least one of the plurality of electrodes and output the received power signal thereto.

19 Claims, 13 Drawing Sheets

(52) U.S. Cl.
CPC .................. *B01L 2300/0829* (2013.01); *B01L 2400/0421* (2013.01)

(56) References Cited

U.S. PATENT DOCUMENTS

| | | | | |
|---|---|---|---|---|
| 10,444,184 | B2 | 10/2019 | Azpiroz et al. | |
| 2008/0017306 | A1 | 1/2008 | Liu et al. | |
| 2009/0200188 | A1 | 8/2009 | Kaczorowski et al. | |
| 2011/0180425 | A1* | 7/2011 | Kayyem | B01L 3/502761 205/792 |
| 2013/0319862 | A1* | 12/2013 | Kotowski | G01N 27/44704 204/603 |
| 2018/0326417 | A1* | 11/2018 | Wikswo | C12M 23/34 |

FOREIGN PATENT DOCUMENTS

| | | | | | |
|---|---|---|---|---|---|
| CN | 211122654 | | * | 7/2020 | |
| EP | 0631134 | A2 | * | 8/1994 | |
| EP | 4006536 | A1 | * | 6/2022 | G01N 27/44739 |
| RU | 2438732 | C2 | * | 1/2012 | A61N 1/36014 |
| RU | 2738168 | C1 | * | 12/2020 | A61B 5/125 |
| WO | WO-9810869 | A1 | * | 3/1998 | B03C 5/028 |
| WO | WO-0113127 | A1 | * | 2/2001 | B01L 3/502715 |
| WO | WO-03066514 | A2 | * | 8/2003 | G01N 27/4473 |

* cited by examiner

FIG. 2A
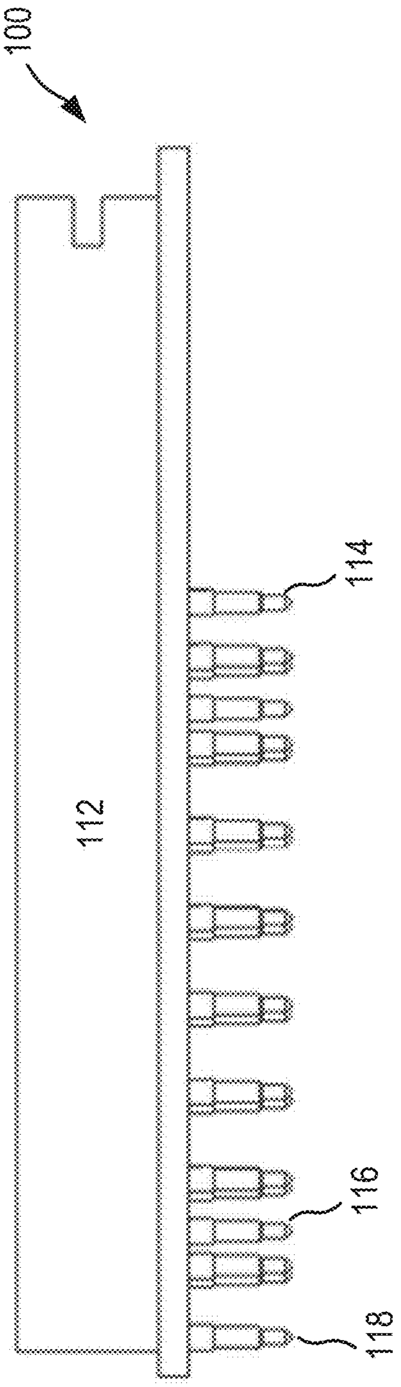
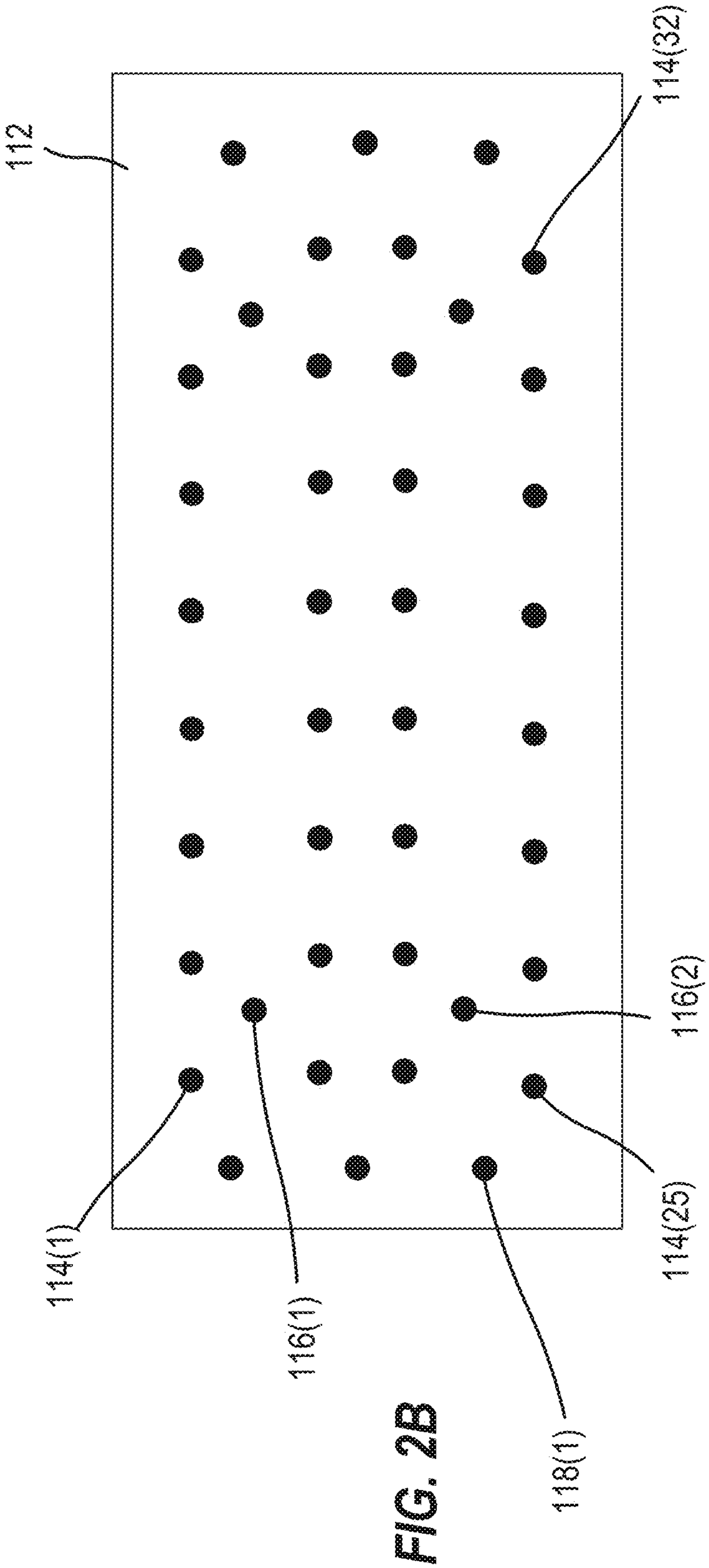
FIG. 2B

230

MICROFLUIDIC CHIP AND ELECTRICAL INTERFACE FOR MICROCHIP ELECTROPHORESIS

BACKGROUND

Microfluidic devices and systems have become increasingly accepted and important as analytical tools in research and development laboratories in both academia and industry. This has fueled rapid progress in this technology over the last several years. One particular area of focus and research in microfluidic devices and systems involves microchip electrophoresis.

Generally speaking, electrophoresis takes advantage of the differential rate of migration of charged species (e.g., particles, molecules) through a separation medium under the influence of an electric field. In this way, the species may be separated and/or characterized according to physical properties, most typically size. In electrophoresis, a sample containing the species of interest is placed at one end of a separation channel and a voltage difference is placed across opposite channel ends until a desired migration end point is reached. The separated analyte molecules may then be detected by various means (e.g., optical detection, radiography, or band elution).

Microchip electrophoresis provides some advantages over other forms of electrophoresis, such as capillary electrophoresis. Among these advantages are the potential for relatively faster analysis as well as a relatively smaller consumption amount of both samples and reagents. FIG. 1A illustrates one example of a microchip electrophoresis arrangement 11. A microchip electrophoresis arrangement 11 may include a sample loading microchannel 12 that intersects a separation microchannel 14. Each of the microchannels 12, 14 may be filled with an ion-comprising buffer and the sample may be received into the sample inlet 13. The sample may be driven (e.g., electrophoretically driven or vacuum driven) in the sample loading microchannel 12. Secondly, an electric field may be applied to the separation microchannel 14 and a plug of the sample (usually consisting of no more than a few nanoliters, or even at the picoliter level) is migrated or dispensed from the sample loading microchannel 12 into the separation microchannel 14. The plug of sample may move along the separation microchannel 14 and may be separated into small bands that cross the detection point 18 for recording and analysis.

FIG. 1B illustrates a top down schematic diagram view of another microchip electrophoresis arrangement. A microchip 20 may include a sample loading microchannel 22 (between inlet 23 and well 1), a separation microchannel 24 (between wells 7 and 10), and a cross-injection microchannel 26 (between wells 3 and 8) that intersects both the sample loading microchannel 22 and the separation microchannel 24. The sample loading microchannel 22 may be coupled to a sipper that is not shown in FIG. 1B, but extends perpendicular below the major surface of the microchip 20 and is located at or near the inlet 23. The sipper may draw samples from a well plate (not shown in FIG. 1B) either by vacuum or electrophoretically. As the sample traverses the sample loading microchannel 22 from the inlet 23 to the sample waste well (i.e., well 1) a cross-injection voltage may be applied via electrodes (not shown in FIG. 1B) coupled to wells 3 and 8 to the cross-injection channel 26, thereby moving a plug of sample from the sample loading microchannel 22 and into alignment with the separation microchannel 24. A separation voltage is then applied via electrodes coupled to wells 7 and 10 to perform electrophoresis in the separation microchannel 24. The plug of sample may move along the separation microchannel 24 and may be separated into small bands that cross the detection point 28 for recording and analysis. In some situations, the sample may be combined with a stain or marker (e.g., from a channel coupled to well 4) after being drawn into the microchip 20. In some situations, destain to remove a portion of the stain may be applied to the plug of sample within the separation microchannel 24.

FIG. 1C illustrates another example of a microchip electrophoresis arrangement 30, in which an electrode 32 is brought into contact with an electrically conductive contacting element 34 that is within a well 35 of a chip 36. The chip 36 comprises a first glass substrate 37, a second glass substrate 38 bonded to the first glass substrate 37, and a carrier element 39 bonded to the second glass substrate 38. The electrically conductive contacting element 34 extends only partially into the carrier element 39. In the first glass substrate 37, a plurality of channels 40 are provided, and in the second substrate 38, a plurality of through holes 41 are provided. An electrical potential may be applied via the electrode 32 and the contacting element 34 to fluid within the well 35, thereby generating an electric field also in the channel 40 for transporting electrically charged components of the fluid through the channels 40.

SUMMARY

Some aspects of the present disclosure provide electrophoresis devices. For example, an electrophoresis device according to the present disclosure may include: a plurality of electrodes each including a galvanic contact surface configured to contact a respective contact of a microfluidic chip; a shared power amplifier configured to output a selected first power signal; and a selector configured to receive the first power signal from the shared power amplifier and configured to output the received power signal to a selected one or more of the plurality of electrodes.

In some embodiments, the plurality of electrodes is a plurality of first electrodes, and the electrophoresis device may include at least one independent power amplifier configured to output a selected second power signal to at least one second electrode that is separate from the plurality of first electrodes.

In some embodiments, the shared power amplifier may be configured to output a selected one of a constant current power signal, a constant voltage power signal, or a pulsed power signal as the first power signal. In some embodiments, the plurality of electrodes may include a plurality of sample electrodes and a plurality of ladder electrodes, and the selector may include outputs corresponding in number to a sum of a number of the plurality of sample electrodes and a number of the plurality of ladder electrodes.

In some embodiments, the electrodes may be arranged in a format corresponding to a Society for Biomolecular Screening (SBS) plate format, for example a 96 well plate format or a 384 well plate format.

In some embodiments, the plurality of electrodes may have between 5 and 500 electrodes, such as between 6 and 300 electrodes, and as an example 126 electrodes.

In some embodiments, the electrophoresis device may include an electro-mechanical assembly configured to move the plurality of electrodes into contact with the respective contacts of the microfluidic chip.

In some embodiments, the electrodes are encapsulated in an insulator block that galvanically isolates the electrodes.

In some embodiments, the contacts of the microfluidic chip may include conductive eyelets, and the electrodes may be configured to contact at least a portion of the respective conductive eyelet.

In some embodiments, the contacts may be pogo pins, sliding contacts, wires, and/or probes.

Another example of an electrophoresis device according to the present disclosure may include: a plurality of first electrodes each including a galvanic contact surface configured to contact a respective contact surface of a microfluidic chip; at least one second electrode separate from the plurality of first electrodes and including a galvanic contact surface configured to contact a respective contact surface of the microfluidic chip; a first power amplifier configured to output a selected one of a constant current power signal, a constant voltage power signal, or a pulsed power signal as a first power signal; a selector configured to receive the first power signal from the first power amplifier and configured to select at least one of the plurality of first electrodes and output the received first power signal thereto; and a second power amplifier configured to output to the at least one second electrode a selected one of a constant current power signal, a constant voltage power signal, or a pulsed power signal that differs from the output of the first power amplifier as a second power signal.

Another example of an electrophoresis device according to the present disclosure may include: a plurality of electrodes arranged corresponding to a Society for Biomolecular Screening (SBS) plate format, each including a galvanic contact surface configured to contact a respective contact surface of a microfluidic chip having sample wells arranged in the SBS plate format; first and second power amplifiers each configured to output different ones of constant current power signals, constant voltage power signals, or pulsed power signals; and a selector configured to receive a power signal from the first power amplifier and configured to select at least one of the plurality of electrodes and output the received power signal thereto.

Some aspects of the present disclosure may provide microfluidic chips. For example, a microfluidic chip according to the present disclosure may include a non-conductive substrate having a microfluidics channel therein; and a plurality of sample wells each fluidly coupled to the microfluidics channel and each having a galvanic contact having a first portion at an upper surface of the sample well and a second portion that extends into the non-conductive substrate.

In some embodiments, the upper surface of each sample well may include an annular-shaped eyelet. For example, the first portion of the galvanic contact may include an entire portion of the annular-shaped eyelet. The second portion of the galvanic contact that extends into the non-conductive substrate may be a portion of an annulus.

In some embodiments, the sample wells of the microfluidic chip may be arranged in a format corresponding to a Society for Biomolecular Screening (SBS) plate format, such as a 96 or 384 well plate format.

In some embodiments, each sample well of the microfluidic chip may be within a non-conductive caddy. The non-conductive caddy may include injection molded plastic materials. The non-conductive caddy may include acrylic, Polyphenylene Ether (PPE), polycarbonate, or acrylonitrile butadiene styrene (ABS).

In some embodiments, the non-conductive substrate of the microfluidic chip may include cyclic olefin copolymer (COC), cyclic olefin polymer (COP), quartz, or soda lime glass.

In some embodiments, the galvanic contact of each sample well may include a conductive carbon-based material.

In some embodiments, each sample well is configured to receive a respective electrode from an electrophoresis device, such as the electrophoresis devices discussed above.

In some embodiments, the microfluidics chip may include at least one reference well.

In some embodiments, the microfluidics chip includes a carrier that surrounds and isolates the sample wells. For example, the upper surfaces of the sample wells may be coplanar with an upper surface of the carrier.

Another example of a microfluidic chip according to the present disclosure may include: a non-conductive substrate having a microfluidics channel therein; and a non-conductive caddy that includes a plurality of wells, each providing a microfluidic connection to the microfluidics channel, each well having an upper conductive contact at an upper surface thereof, and each well having a conductive lower portion that extends below an upper surface of the non-conductive substrate.

Another example of a microfluidic chip according to the present disclosure may include: a non-conductive substrate having a microfluidic channel; and a plurality of sample wells arranged corresponding to a Society for Biomolecular Screening (SBS) plate format, at least some of the sample wells connected in common to the microfluidic channel. Each sample well may have a galvanic contact with a first portion at an upper surface of the sample well and a second portion that extends into the non-conductive substrate.

Some aspects of the present disclosure provide microfluidic systems. For example, a microfluidic system according to the present disclosure may include: a microfluidic chip having a plurality of sample wells with respective galvanic contacts in upper surfaces thereof; a plurality of first electrodes each configured to contact a respective one of the galvanic contacts of the microfluidic chip; first and second power amplifiers each configured to output a respective and different first and second power signals; a selector configured to receive the first power signal from the first power amplifier and configured to output the received first power signal to a selected at least one of the plurality of first electrodes; and at least one second electrode separate from the plurality of first electrodes and configured to receive the second power signal from the second power amplifier.

In some embodiments, each of the first and second power amplifiers may be configured to output a selected one of a constant current power signal, a constant voltage power signal, or a pulsed power signal.

In some embodiments, the selector may include outputs corresponding in number to a number of the plurality of first electrodes.

In some embodiments, the selector may include outputs corresponding in number to a number of the plurality of sample wells.

In some embodiments, the first electrodes may be arranged in a format corresponding to a Society for Biomolecular Screening (SBS) plate format, such as a 96 well plate format or a 384 well plate format.

In some embodiments, the plurality of electrodes of the microfluidics system may have between 5 and 500 electrodes, such as between 6 and 300 electrodes, and as an example 126 electrodes.

In some embodiments, the microfluidics system may include an electro-mechanical assembly configured to move the plurality of first electrodes into contact with the respective galvanic contacts of the microfluidic chip.

In some embodiments, the first electrodes of the microfluidics system may be encapsulated in an insulator block that galvanically isolates the electrodes.

In some embodiments, the galvanic contacts of the microfluidic chip of the microfluidics system may include conductive eyelets, and the electrodes may be configured to contact at least a portion of the respective conductive eyelet.

In some embodiments, the first electrodes of the microfluidics system may include one of more of pogo pins, sliding contacts, wires, and/or probes.

Another example of a microfluidic system according to the present disclosure may include: a microfluidic chip having a non-conductive substrate and sample wells arranged on the non-conductive substrate according to a Society for Biomolecular Screening (SBS) plate format, each sample well having a galvanic contact with a first portion at an upper surface of the sample well and a second portion that extends into the non-conductive substrate; a plurality of first electrodes and at least one second electrode separate from the plurality of first electrodes arranged corresponding to the SBS plate format, each of the first and second electrodes configured to contact a respective galvanic contact of the microfluidic chip; first and second power amplifiers each configured to output different ones of constant current power signals, constant voltage power signals, or pulsed power signals; and a selector configured to receive a power signal from the first power amplifier and configured to select at least one of the plurality of first electrodes and output the received power signal thereto. At least one second electrode may be configured to receive the output of the second power amplifier.

Another example of a microfluidic system according to the present disclosure may include: a microfluidic chip having a non-conductive substrate and sample wells connected in common to a microfluidic channel within the non-conductive substrate, each sample well having a galvanic contact with a first portion at an upper surface of the sample well and a second portion that extends into the non-conductive substrate; a plurality of electrodes each configured to contact a respective galvanic contact of the microfluidic chip; an electro-mechanical assembly configured to move the plurality of electrodes into contact with the respective galvanic contacts of the microfluidic chip; and a selector configured to receive a power signal from a respective first power amplifier and configured to select at least one of the plurality of electrodes and output the received power signal thereto.

The present disclosure is not limited to the examples and aspects recited above, and numerous other examples and embodiments will be provided herein.

BRIEF DESCRIPTION OF THE DRAWINGS

FIG. 2A is a side view of an electrical interface for microchip electrophoresis according to aspects of the present disclosure, and FIG. 2B is a bottom view of the electrical interface.

DETAILED DESCRIPTION

Figure 1A:
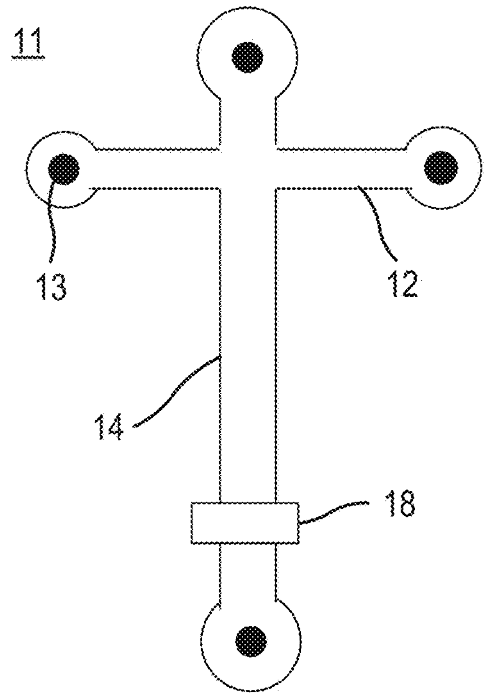
FIG. 1A (Related Art)
FIGS. 1A-C illustrate various aspects of microchip electrophoresis arrangements in the related art.
Figure 1B:
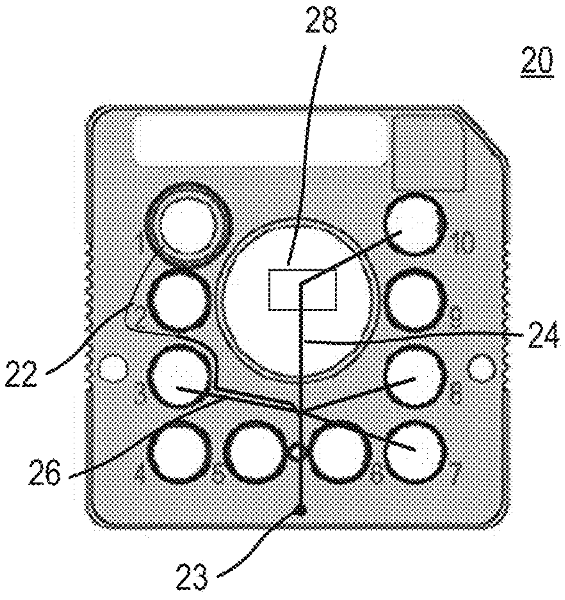
FIG. 1B (Related Art)
Figure 1C:
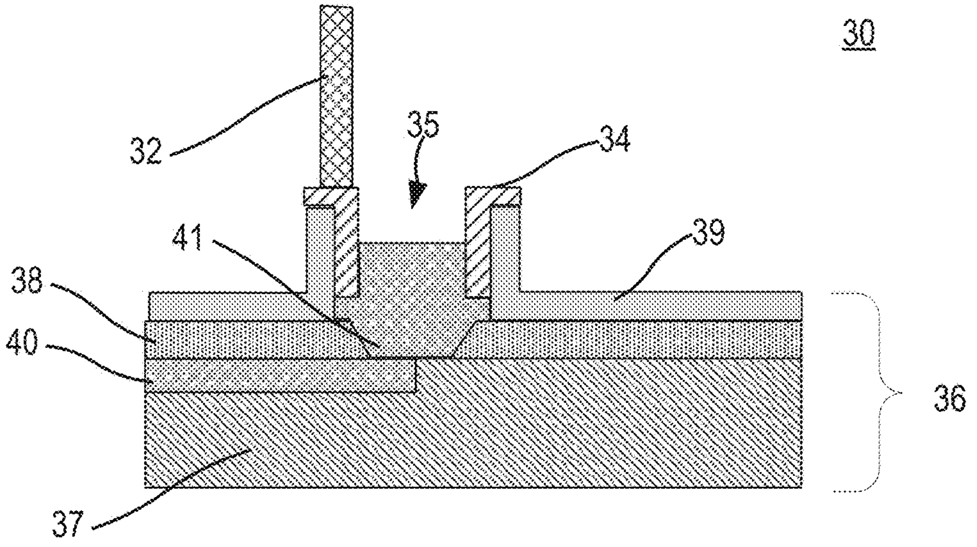
FIG. 1C (Related Art)

The present disclosure is based in part on the recognition that present microchip electrophoresis interfaces, such as those used in conjunction with the arrangements of FIGS. 1A-1C, may be insufficient for various applications. For example, some present microchip electrophoresis interfaces may not permit sufficiently long separation channels, and may not provide desirable higher resolution, higher separation voltages, and higher throughput of sample analysis.

Accordingly, the present disclosure provides microchip electrophoresis devices and systems, as well as related methods. According to some aspects of the present disclosure, a microfluidic chip having a plurality of sample wells is provided. Additional wells (e.g., reagent wells, waste wells, ladder wells) may also be provided in the microfluidic chip. Each well may be coupled to a microfluidic chip channel within a substrate (e.g., glass substrate) within the microfluidic chip. Each well of the microfluidic chip may have a respective conductive eyelet. In some embodiments, the conductive eyelet may have a substantially annular shape. A partial or entire top surface of the conductive eyelet may be used as an electrical contact. The conductive eyelet may form all or a portion of a sidewall of the well. The conductive eyelet may receive therein a biological and/or chemical fluid to be used in electrophoresis. A portion of the conductive eyelet may extend into the glass substrate and interface with the microfluidic chip channel therein. The microfluidic chip is configured such that the sample wells thereof may be configured in rows. For example, arrangement of the sample wells may correspond to Society for Biomolecular Screening (SBS) plate format (e.g., a 96 well SBS plate format or a 384 well SBS plate format) for compatibility with standard liquid handling apparatuses and robots. Examples of microfluidics chip according to the present disclosure are described in greater detail with reference to FIGS. 5A-5D.

Some aspects of the present disclosure provide an electrical interface that may be used with the microfluidic chips described herein. Aspects of the electrical interface are now described with reference to FIGS. 2A and 2B, which are a side view and bottom view, respectively of an electrical interface 100, and FIG. 3, which is a block diagram of some of the electrical components of the electrical interface 100.

The electrical interface 100 may include a controller 102, at least one shared power signal generator 104, at least one independent power signal generator 106, a plurality of electrodes 114, 116, and 118, and at least one selector 110 coupled to the shared power signal generator 104 and between the at least one selector 110 and some of the plurality of electrodes 114, 116. In some embodiments, the controller 102, the shared power signal generator 104, the independent power signal generator 106, and selector 110 may be within a housing 112, although in some embodiments one or more of the components may be outside of the housing 112.

The plurality of electrodes 114, 116, 118 may be provided. The plurality of electrodes may include sample electrodes 114, which may correspond respectively to sample wells of the microfluidics chip. For example, there may be 32 sample wells in the microfluidics chip, and there may be a respective set of 32 sample electrodes 114. The plurality of electrodes may include ladder (reference) electrodes 116, which may correspond respectively to ladder wells of the microfluidics chip. For example, there may be 2 ladder wells in the microfluidics chip, and there may be a respective set of 2 ladder electrodes 116. Other wells (e.g., reagent wells, wells coupled to separation channels, waste wells, or the like) may be present in the microfluidics chip, and the plurality of electrodes may have other electrodes 118 that correspond respectively to the other wells. Each of the plurality of electrodes 114, 116, 118 may comprise a galvanic contact surface configured to contact an electrical contact of the microfluidic chip. In some embodiments, the plurality of electrodes 114, 116, 118 comprises pogo pins. In some embodiments, the plurality of electrodes 114, 116, 118 comprises sliding contacts. In some embodiments, the plurality of electrodes 114, 116, 118 comprises wires. In some embodiments, the plurality of electrodes 114, 116, 118 comprises probes. The plurality of electrodes 114, 116, and 118 may be grouped into first electrodes comprising the sample electrodes 114 and the ladder electrodes 116, and second electrodes comprising the other electrodes 118, although the present disclosure is not limited thereto.

The plurality of electrodes 114, 116, and 118 may be arranged in a format that corresponds to a Society for Biomolecular Screening (SBS) plate format, for example a 96 or 384 well plate format. In other words, the plurality of electrodes 114, 116, 118 may be arranged at spaced apart intervals so as to be in alignment with wells positioned according to the SBS plate format.

In some embodiments, the plurality of electrodes 114, 116, 118 may have between 5 and 500 electrodes. In some embodiments, the plurality of electrodes 114, 116, 118 may have between 6 and 300 electrodes. In some embodiments, the plurality of electrodes 114, 116, and 118 may have 42 electrodes or a multiple of 42 (e.g., 126 electrodes).

As best seen in FIGS. 2A and 2B, in some embodiments the plurality of electrodes 114, 116, 118 may include extension portions that contact respective contact surfaces of the microfluidics chip. The extension portions may be offset and/or have non-uniform alignments. For example, each of a first row 114(1)-114(8) of sample electrodes 114 may be aligned to contact a first portion of the respective contact surfaces of the microfluidics chip, and each of a second row 114(25)-114(32) of sample electrodes 114 may be aligned to contact a second and different portion of the respective contact surfaces of the microfluidics chip. In some embodiments, each of the plurality of electrodes 114, 116, and 118 may each contact the same portion of the respective contact surfaces of the microfluidics chip.

The shared power amplifier 104 may be a power signal generator and may be controlled by the controller 102 and may be configured to output one or more different power signals. For example, the shared power amplifier 104 may be configured to output a selected one of a constant current power signal having a selected constant current, a constant voltage power signal having a selected constant voltage, or a pulsed power signal having a selected voltage and/or current, selected duration, selected frequency, and the like.

The shared power amplifier 104 may be coupled to the selector 110, which may also be controlled by the controller 102. The selector 110 may have a number of outputs that corresponds to a sum of a number of the sample electrodes 114 and a number of the ladder electrodes 116, although the present disclosure is not limited thereto. The selector 110 may receive a power signal output by the shared power amplifier 104 at a first input (e.g., a power input) thereof, and receive a selection signal from the controller 102 at a second input (e.g., a selection input). Based on the selection signal, the selector 110 may select one of the outputs of the selector 110 and communicate the power signal thereto. In some embodiments, the selector 110 may be a multiplexer or demultiplexer.

In some embodiments, two or more shared power amplifiers 104 and two or more selectors 110 may be provided. Each of the plurality of selectors 110 may configured to receive a power signal from a respective one of the plurality of power amplifiers and configured to output the received power signal to a selected at least one of the plurality of electrodes 114, 116.

Each of the independent power amplifiers 106 may be a power signal generator and may be controlled by the controller 102 and may be configured to output one or more different power signals. For example, each independent power amplifier 106 may be configured to output a selected one of a constant current power signal having a selected constant current, a constant voltage power signal having a selected constant voltage, or a pulsed power signal having a selected voltage and/or current, selected duration, selected frequency, and the like. Each independent power amplifier 106 may be coupled (e.g., directly coupled) to one or more electrodes 118 (e.g., one or more other electrodes). Each independent power amplifier 106 may also be controlled by the controller 102. Accordingly, each of the one or more other electrodes 118 may receive a power signal output by the independent power amplifier 106. In some embodiments, two or more independent power amplifiers 106 may be provided, each driving a different number of electrodes 118.

The power amplifiers 104 and 106 may be grouped into a first group comprising the shared power amplifier 104 and a second group comprising the independent power amplifier (s) 106, with the understanding that the present disclosure is not limited thereto.

The power amplifiers 104 and 106 may output high voltage signals (e.g., on the order of −4000 Volts to 4000 Volts), and by creating different constant voltage, constant current, and/or pulsed power signals, may accomplish electrokinetic separation for each sample.

The controller 102 may include one or more devices configured to perform computational operations. For example, the controller 102 can include one or more processors (e.g., microprocessors, ASICs, microcontrollers, programmable-logic devices, or the like). The controller 102 may also include one or more memory devices for storing data and/or instructions to be processed by the processors. For example, the memory devices can include dynamic random access memory (DRAM), static random access memory (SRAM), and/or other types of memory. In some embodiments, instructions stored in the memory of the controller 102 may include one or more program modules or sets of instructions which may be executed by the processor of the controller 102. The controller 102 (and more specifically the processor and memory thereof) may be configured to control the shared power amplifier 104, the independent power amplifiers 106, and the selector 110 to generate one or more power signals and provide the generated power signals to one or more electrodes 114, 116, and 118 of the electrical interface 100.

Figure 4A:
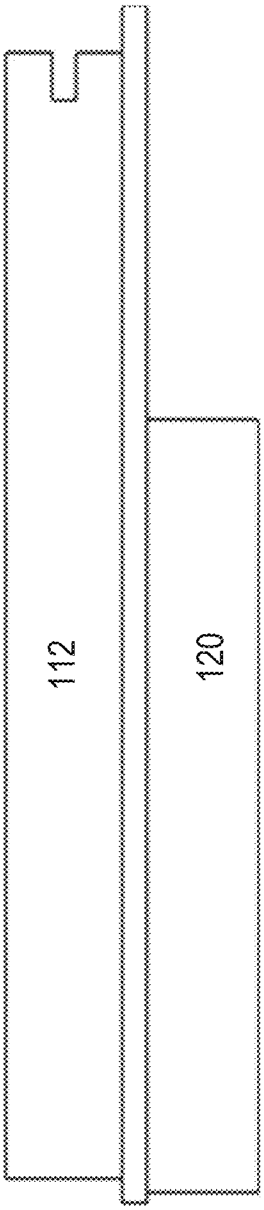
FIGS. 4A, 4B, and 4C are respectively a side view, bottom view, and cross-sectional view showing aspects of an insulator according to aspects of the present disclosure that may be used with the electrical interface of FIGS. 2A-B and 3.
Figure 4C:
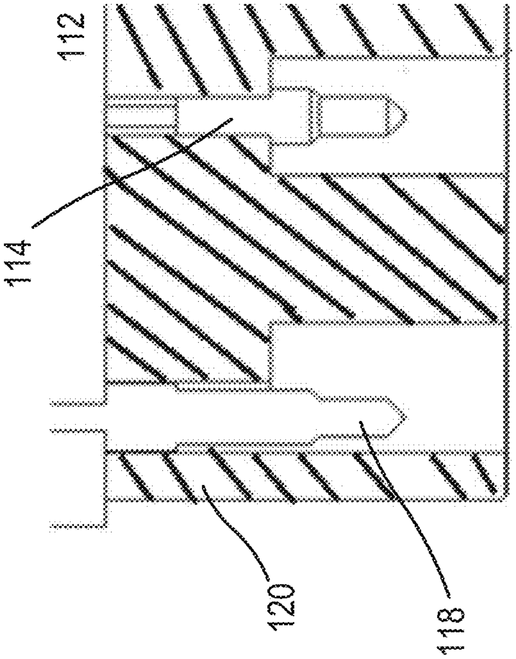
Figure 4B:
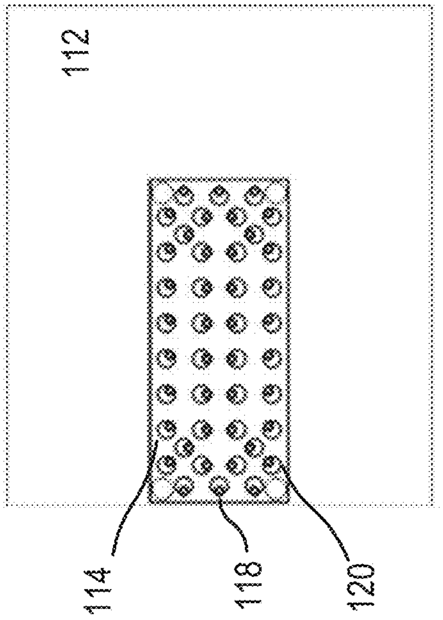

FIGS. 4A, 4B, and 4C are respectively a side view, bottom view, and cross-sectional view showing aspects of an insulator 120. The insulator 120 may be used with the electrical interface 100 and may be on the same side of the housing 112 as the plurality of electrodes 114, 116, and 118. The insulator 120 may encapsulate the electrodes 114, 116, and 118 therein, thereby galvanically isolating the electrodes 114, 116, and 118 from each other. As seen in FIG. 4C, when the extension portions of the electrodes are offset from each other and/or have non-uniform alignments, the portions of insulator 120 that receive the electrodes 114, 116, and 118 may be correspondingly non-uniform.

Figure 5A:
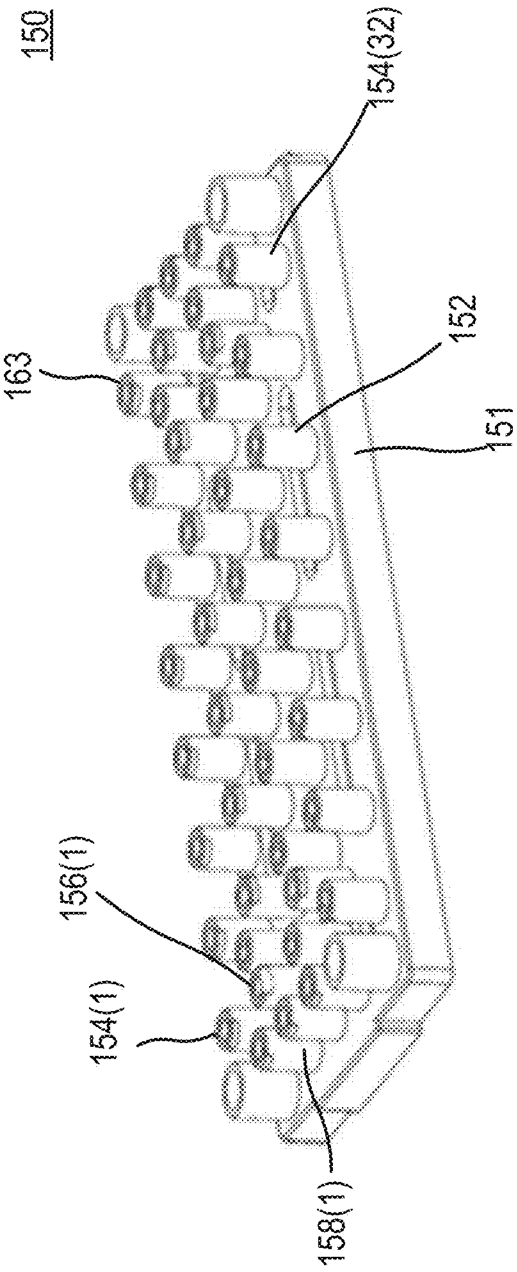
FIG. 5A is a perspective view of an example of a microfluidics chip according to aspects of the present disclosure that may be used in conjunction with the microfluidics chip interface of FIGS. 2A, 2B, and 3.
Figure 5B:
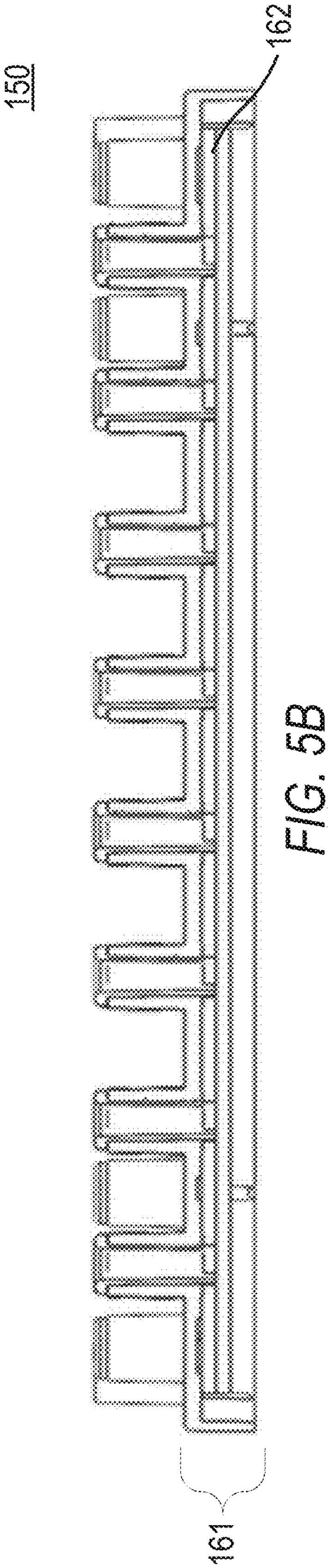
FIG. 5B is a cross-sectional view of the microfluidics chip of FIG. 5A.
Figure 5C:
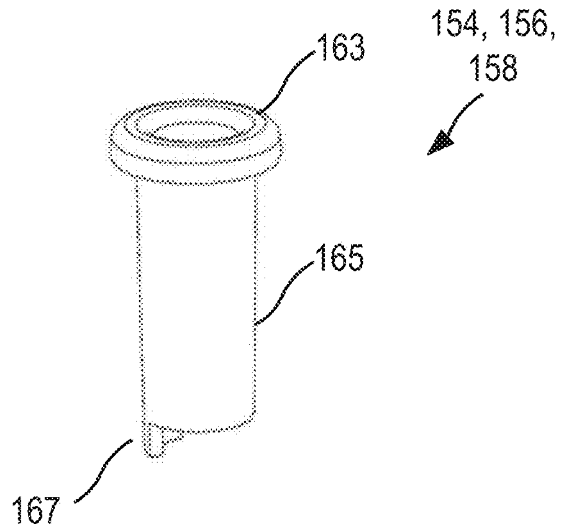
FIG. 5C is a perspective view of a conductive eyelet of the microfluidics chip of FIGS. 5A and 5B.

As discussed above, the electrical interface 100 may be used with microfluidic chips according to some aspects of the present disclosure. FIG. 5A is a perspective view of an example of a microfluidics chip according to aspects of the present disclosure that may be used in conjunction with the microfluidics chip interface of FIGS. 2A, 2B, and 3. FIG. 5B is a cross-sectional view of the microfluidics chip of FIG. 5A. FIG. 5C is a perspective view of a conductive eyelet of the microfluidics chip of FIGS. 5A and 5B.

The microfluidics chip 150 may include a non-conductive caddy 151 that at least partially surrounds a non-conductive substrate 161 having one or more microfluidics channels 162 therein. The non-conductive substrate 161 may include one or more layers, and in some embodiments may include one or more of cyclic olefin copolymer (COC), cyclic olefin polymer (COP), quartz, or soda lime glass. In some embodiments, the non-conductive caddy 161 may include, as examples, an acrylic, Polyphenylene Ether (PPE), polycarbonate, or acrylonitrile butadiene styrene (ABS). In some embodiments, the non-conductive caddy 161 comprises an injection molded plastic material.

A plurality of wells 154, 156, and 158 may extend from an upper surface of the non-conductive substrate 161 and be each fluidly coupled to at least one of the microfluidics channels 162. The plurality of wells 154, 156, and 158 may include sample wells 154, which may correspond respectively to sample electrodes 114 of the electrical interface 100. For example, there may be 32 sample wells in the microfluidics chip 150, and there may be a respective set of 32 sample electrodes 114. The plurality of electrodes may include ladder (reference) wells 156, which may correspond respectively to ladder electrodes 116 of the electrical interface 100. For example, there may be 2 ladder wells 156 in the microfluidics chip 150, and there may be a respective set of 2 ladder electrodes 116. Other wells 158 (e.g., reagent wells, wells coupled to separation channels, waste wells, or the like) may be present in the microfluidics chip 150, and as discussed above the plurality of electrodes may have other electrodes 118 that correspond respectively to the other wells 158. As with the plurality of electrodes 114, 116, and 118, the plurality of wells 154, 156, and 158 may be grouped into first wells comprising the sample wells 154 and the ladder wells 156, and second wells comprising the other wells 158, although the present disclosure is not limited thereto.

Each of the wells 154, 156, and 158 may have a galvanic contact in an upper surface thereof. For example, the non-conductive caddy 151 may be formed such that non-conductive outer wells 152 are formed, and each outer well 152 may have therein a conductive eyelet 163 having sidewalls 165, best seen in FIG. 5C. In some embodiments the conductive eyelet may be fused to the outer well 152. The conductive eyelet 163 may have an annular shape in some embodiments, although the present disclosure is not limited thereto. The conductive eyelet 163 may have a first galvanic contact portion at an upper surface of the corresponding well, and a second galvanic contact portion 167 that extends into the non-conductive substrate. In some embodiments, the first portion of the galvanic contact comprises an entire portion of the annular-shaped eyelet. In some embodiments, the second galvanic contact portion 167 that extends into the non-conductive substrate 161 is a portion of an annulus. In some embodiments, the conductive eyelet 163 and/or the galvanic contact thereof comprises a conductive carbon-based material.

Figure 3:
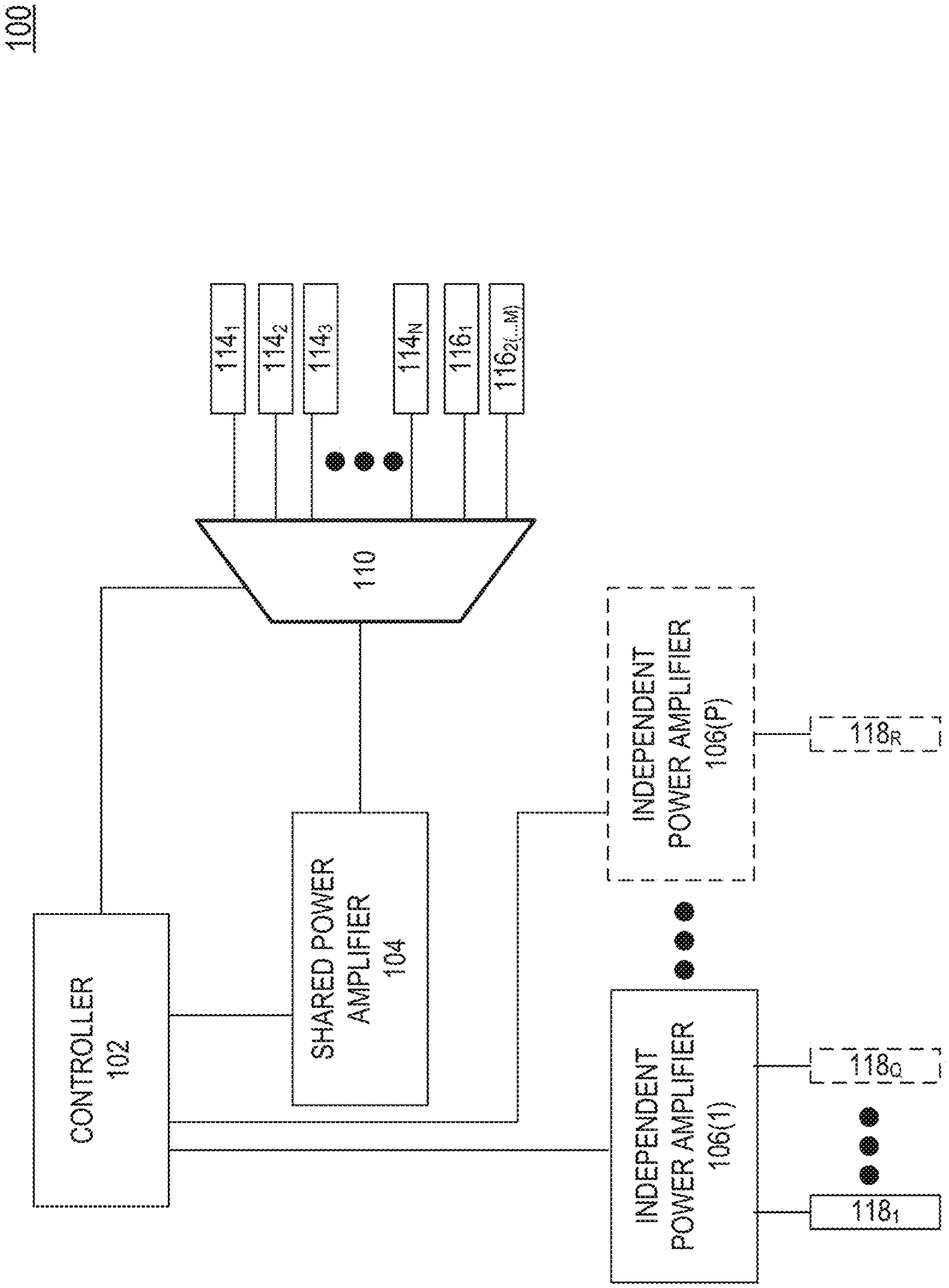
FIG. 3 is a block diagram of components of the electrical interface of FIGS. 2A-B according to aspects of the present disclosure.
Figure 5D:
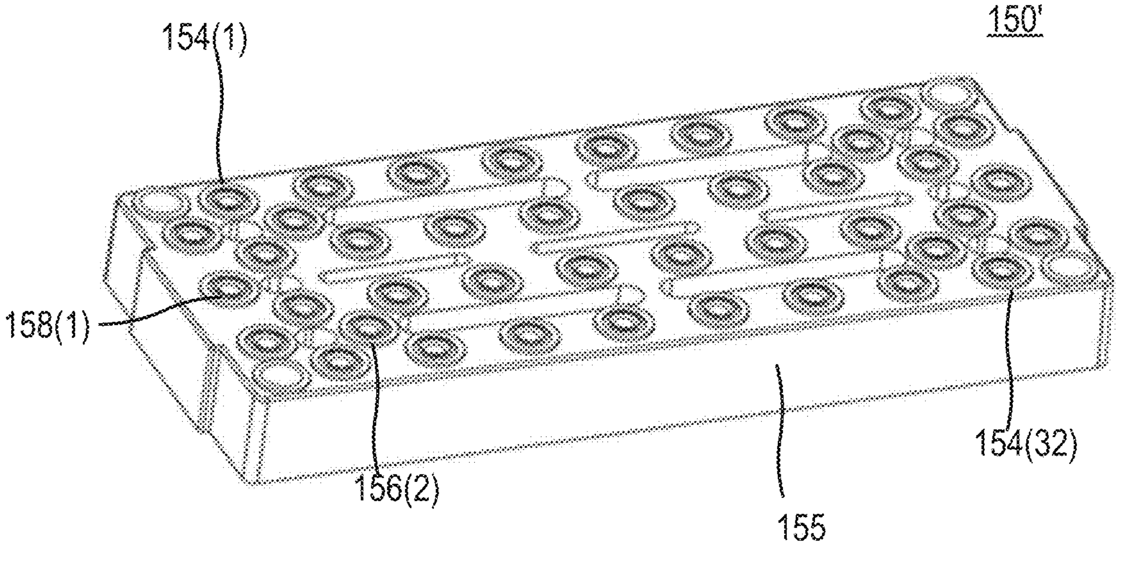
FIG. 5D is a perspective view of another example of a microfluidics chip that may be used with the electrical interface of FIGS. 2A-B and 3.

FIG. 5D is a perspective view of another example of a microfluidics chip 150' that may be used with the electrical interface of FIGS. 2A-B and 3. As seen in FIG. 5D, the microfluidics chip 150' may include a carrier 155 that surrounds and isolates the wells 154, 156, and 158. In some embodiments, upper surfaces of the wells 154, 156, and 158 may be coplanar with an upper surface of the carrier 155.

According to some aspects of the present disclosure, a microfluidic chip 150 having a plurality of sample wells 154 is provided. Additional wells 156 and 158 (e.g., reagent wells, waste wells, ladder wells) may also be provided in the microfluidic chip 150. Each well may be coupled to a microfluidic chip channel 162 within a non-conductive substrate 161 (e.g., glass substrate) within the microfluidic chip 150. Each well of the microfluidic chip may have a respective conductive eyelet 163. In some embodiments, the conductive eyelet 163 may have a substantially annular shape. A partial or entire top surface of the conductive eyelet 163 may be used as an electrical contact. The conductive eyelet 163 may form all or a portion of a sidewall 165 of the well.

The conductive eyelet 163 may receive therein a biological and/or chemical fluid to be used in electrophoresis. A portion 167 of the conductive eyelet 163 may extend into the non-conductive substrate 161 and interface with the microfluidic chip channel 162 therein.

As discussed above, in some embodiments the microfluidic chip 150 may be configured such that the wells 154, 156, and 158 thereof may be configured in rows. For example, arrangement of the wells 154 may correspond to Society for Biomolecular Screening (SBS) plate format (e.g., a 96 well SBS plate format or a 384 well SBS plate format). In some embodiments the microfluidic chip 150 may comply with the ANSI SLAS 1-2004 (R2012) dimensions and/or the ANSI SLAS 4-2004 (R2012) dimensions.

Figure 6A:
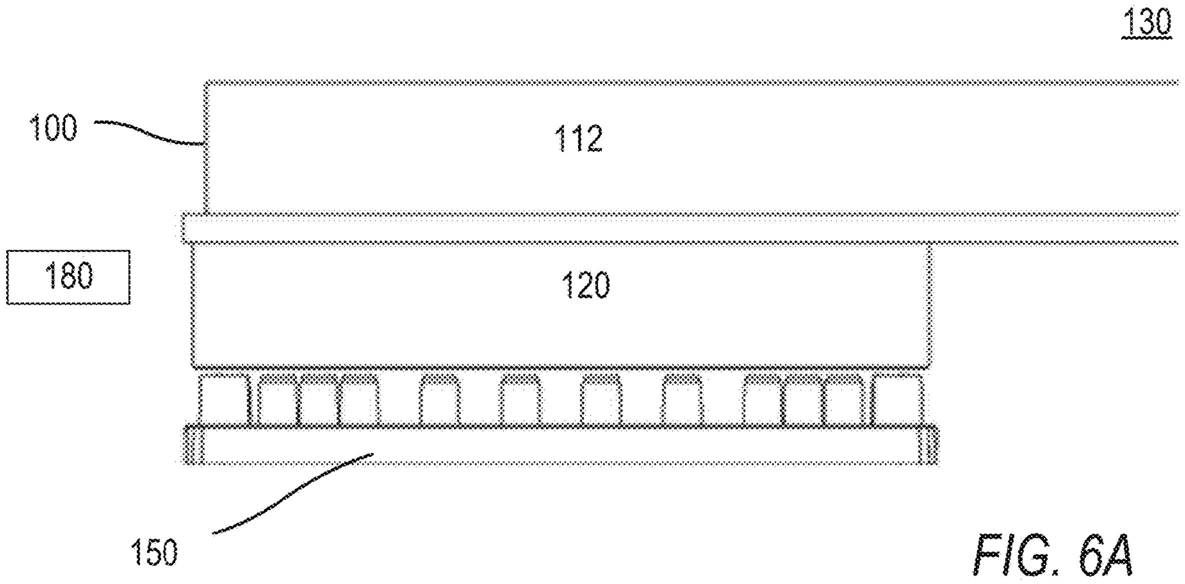
FIG. 6A is a side view illustrating an open or disconnected state of an electrophoresis apparatus according to aspects of the present disclosure comprising the components of FIGS. 2A-5C.
Figure 6B:
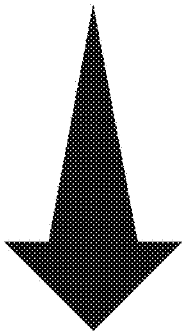
FIG. 6B is a corresponding side view illustrating a closed or physically connected state of the electrophoresis apparatus.
Figure 6B:
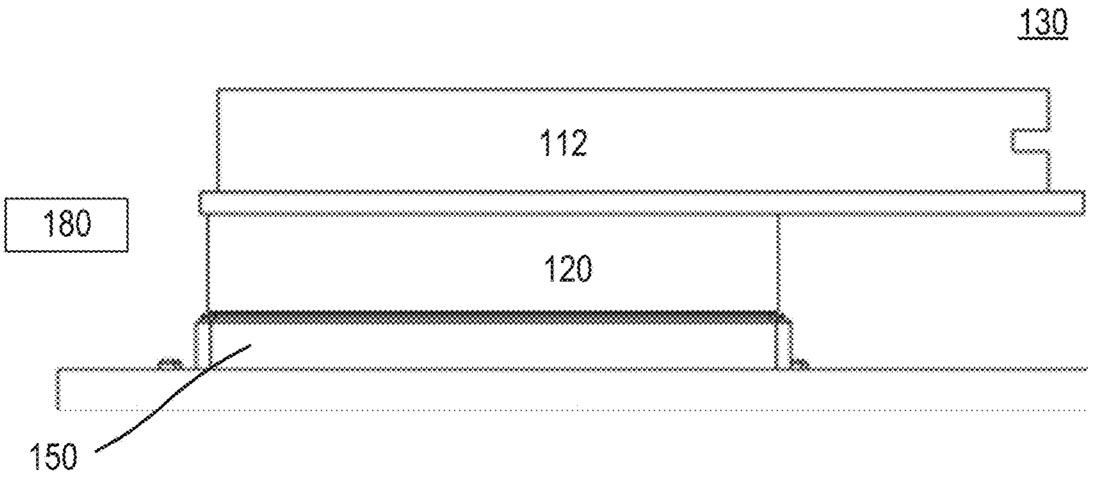
Figure 7A:
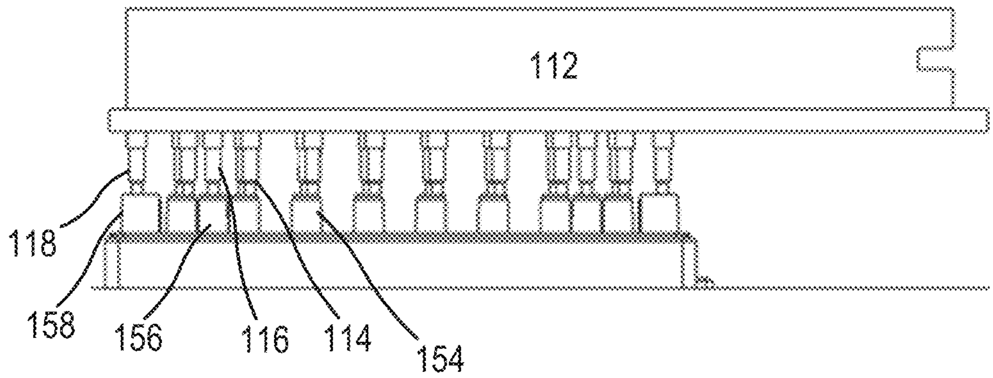
FIGS. 7A and 7B are side views illustrating galvanic contact of the electrical interface of FIGS. 2A, 2B, and 3 with the microfluidics chip of FIGS. 4A-C, with the insulator not shown in FIG. 7A.
Figure 7B:
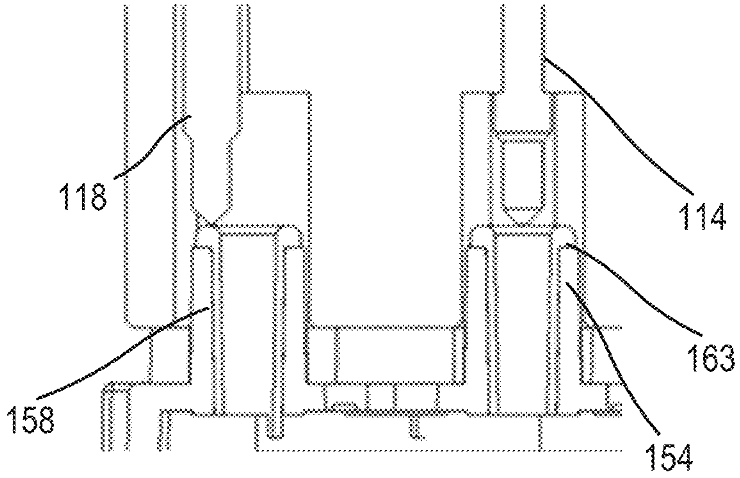

FIG. 6A is a side view illustrating an open or disconnected state of an electrophoresis apparatus or system according to aspects of the present disclosure comprising the components of FIGS. 2A-5C, and FIG. 6B is a corresponding side view illustrating a closed or physically connected state of the electrophoresis system. FIGS. 7A and 7B are side views illustrating galvanic contact of the electrical interface of FIGS. 2A, 2B, and 3 with the microfluidics chip of FIGS. 4A-C in the closed or connected state (e.g., the state of FIG. 6B), with the insulator 120 not shown in FIG. 7A.

In view of the above, and with reference to FIG. 6A-7B, aspects of the present disclosure provide a microfluidic system 130 having a microfluidic chip 150 having a plurality of wells (e.g., sample wells 154, ladder wells 156, and other wells 158) with respective galvanic contacts 163 in upper surfaces thereof. A plurality of electrodes (e.g., sample electrodes 114, ladder electrodes 116, and other electrodes 118) may be provided as part of an electrical interface 100. Each electrode may be configured to contact a respective one of the galvanic contacts of the microfluidic chip 150. One or more shared power amplifiers 104 and independent power amplifiers 106 may be provided as part of the electrical interface, each configured to output a respective power signal. A selector 110 that is part of the electrical interface 100 may be configured to receive a power signal from the shared power amplifier 104 and configured to output the received power signal to a selected at least one of the plurality of electrodes. At least one other electrode may be configured to receive a power signal output by the independent power amplifier 106.

Each of the one or more shared power amplifiers 104 and independent power amplifiers 106 may be configured to output a selected one of a constant current power signal, a constant voltage power signal, or a pulsed power signal. The power amplifiers 104 and 106 may output high voltage signals (e.g., on the order of −4000 Volts to 4000 Volts), and by creating different constant voltage, constant current, and/or pulsed power signals, may accomplish electrokinetic separation for each sample.

In some embodiments, the microfluidic system 130 may include an electro-mechanical assembly 180 that is configured to move the plurality of electrodes into contact with the respective contacts of the microfluidic chip. For example, the microfluidics chip 150 may be raised into a contact position with the electrodes of the electrical interface 100, or the electrical interface 100 and the insulator 120 may be lowered into a contacting position.

Figure 6C:
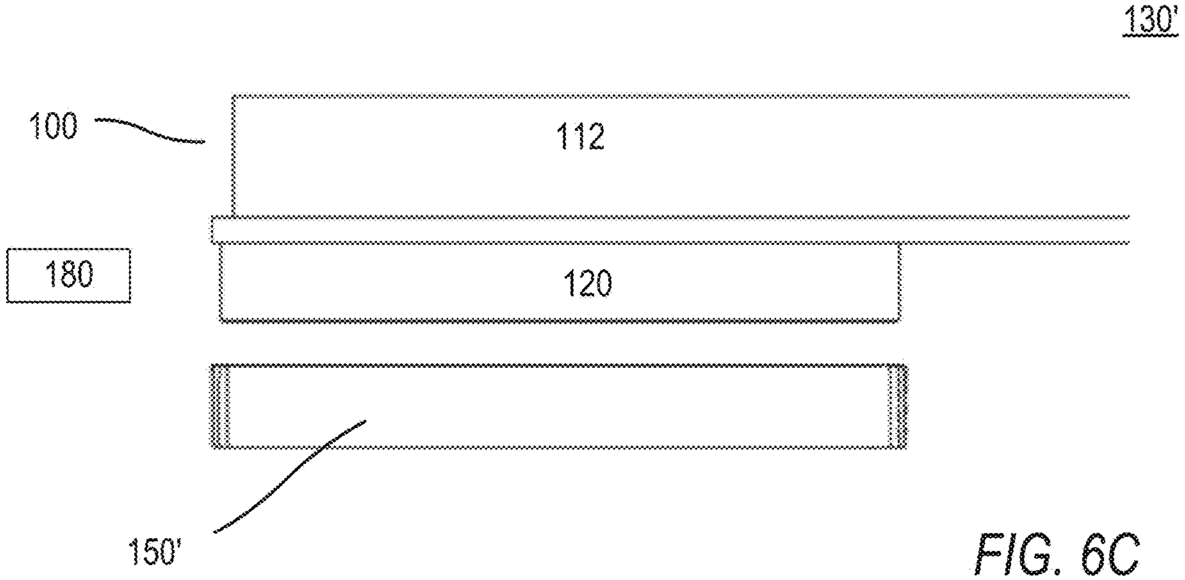
FIG. 6C is a side view illustrating an open or disconnected state of an electrophoresis apparatus according to aspects of the present disclosure comprising the microfluidics chip of FIG. 5D.
Figure 6D:
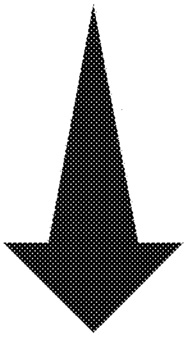
FIG. 6D is a corresponding side view illustrating a closed or physically connected state of the electrophoresis apparatus of FIG. 6C.
Figure 6D:
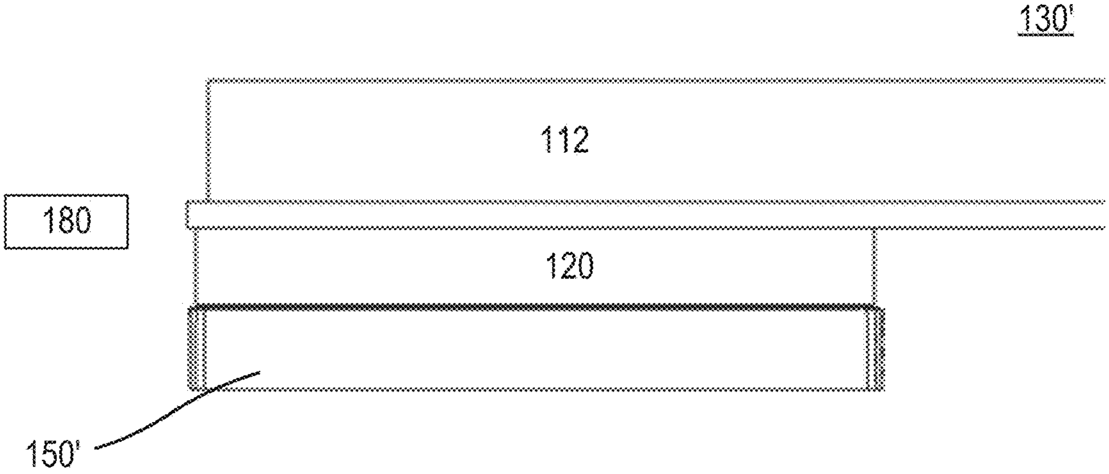

Although FIGS. 6A-7B show the microfluidics chip 150 of FIG. 5A, it is to be understood that the microfluidics chip 150' of FIG. 5D may also be used in a microfluidics system 130' that includes an electro-mechanical assembly 180 that is configured to move the plurality of electrodes into contact with the respective contacts of the microfluidic chip 150', as seen in FIGS. 6C and 6D. In some embodiments, the insulator 120 used with microfluidics chip 150' may differ from the insulator 120 used with microfluidics chip 150 of FIG. 5A. For example, the insulator 120 used with the microfluidics chip 150' may compress and/or abut an upper surface of the microfluidics chip 150' of FIG. 5D. The insulator 120 used with the microfluidics chip 150 of FIG. 5A may have a bottom surface that extends below an upper surface of the microfluidics chip 150 (e.g., to envelop a portion of the vertical height of each of the sample wells of the microfluidics chip 150).

Figure 8:
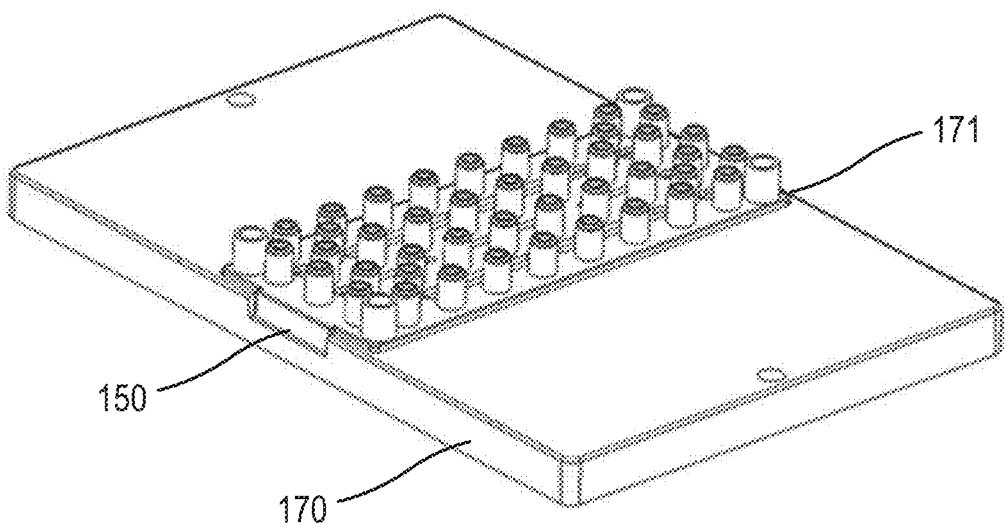
FIG. 8 illustrates a perspective view of the microfluidics chip of FIGS. 4A-C with a plate holder.

FIG. 8 illustrates a perspective view of the microfluidics chip of FIGS. 4A-C with a plate holder 170. The plate holder 170 may include a slot or groove 171 therein configured to receive the microfluidics chip 150. In some embodiments, the microfluidics chip 150 may be integral with the plate holder 170. The plate holder 170 may provide further compatibility with standard liquid handling apparatuses and robots. Although not shown, it is to be understood that a plate holder 170 may be used with the microfluidics chip 150' of FIG. 5D.

Figure 9:
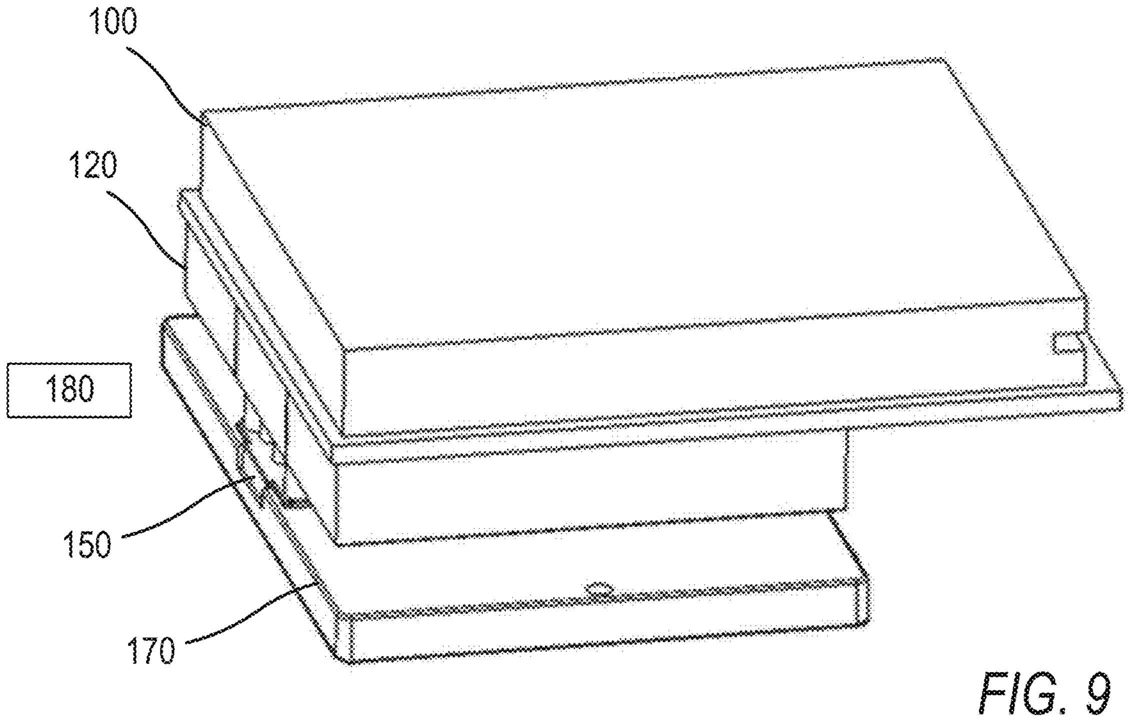
FIG. 9 is a perspective view illustrating an arrangement that includes the components of FIGS. 2A-5C and 8.

FIG. 9 is a perspective view illustrating an arrangement that includes the components of FIGS. 2A-5C and 8. In some embodiments, the electro-mechanical assembly 180 may be configured to move the plurality of electrodes into contact with the respective contacts of the microfluidic chip 150 installed within the plate holder 170. As discussed above, the plate holder 170 that has the microfluidics chip 150 installed therein may be raised into a contact position with the electrodes of the electrical interface 100, or the electrical interface 100 and the insulator 120 may be lowered into the contacting position.

Figure 10:
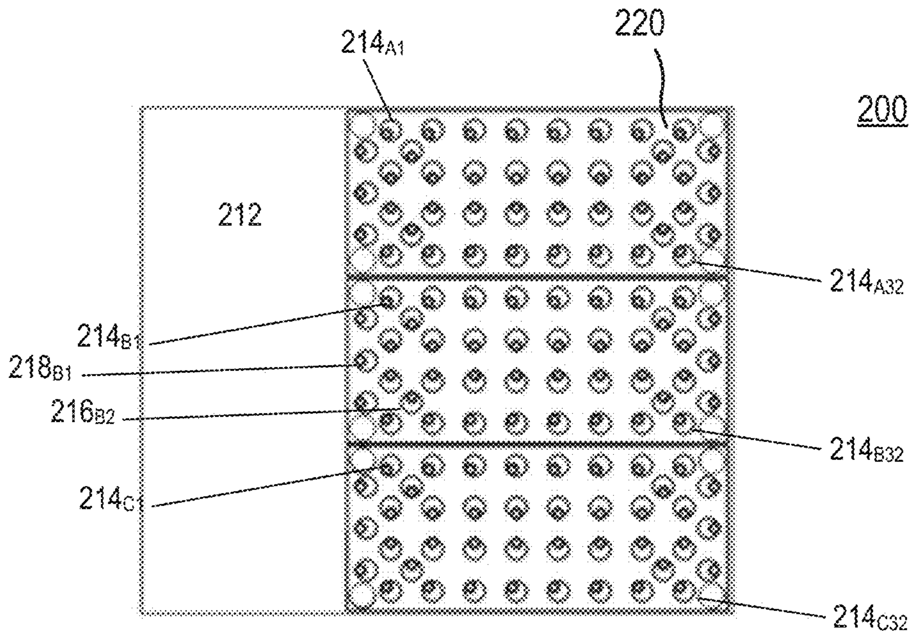
FIG. 10 is a bottom view of an electrical interface according to aspects of the present disclosure.
Figure 11:
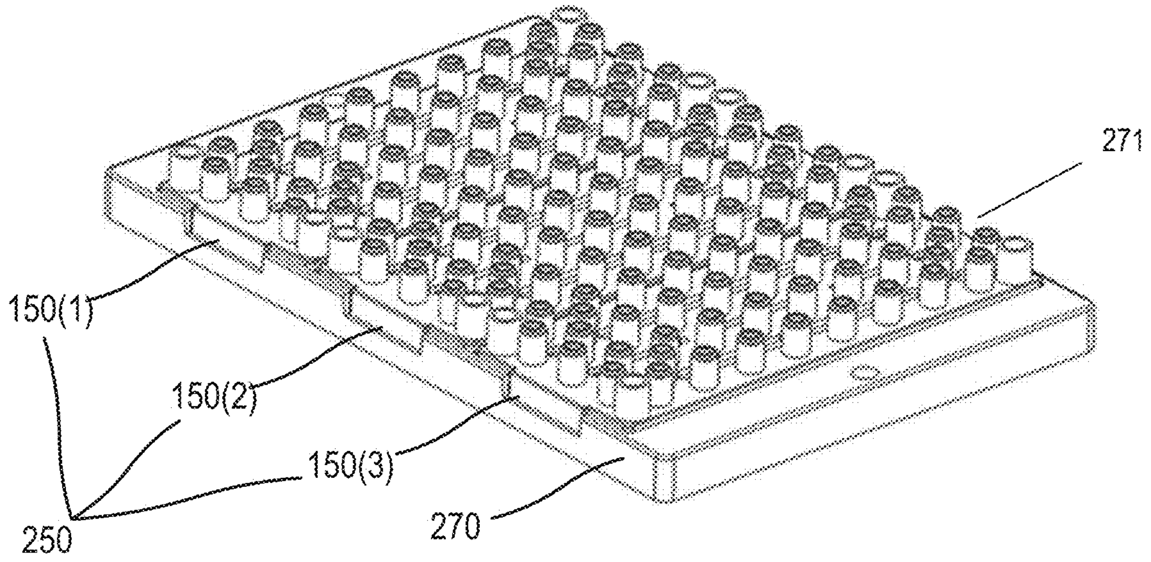
FIG. 11 is a perspective view of an example of a plurality of microfluidics chips (or a single larger microfluidics chip) according to aspects of the present disclosure that may be used in conjunction with the microfluidics chip interface of FIG. 10.
Figure 12:
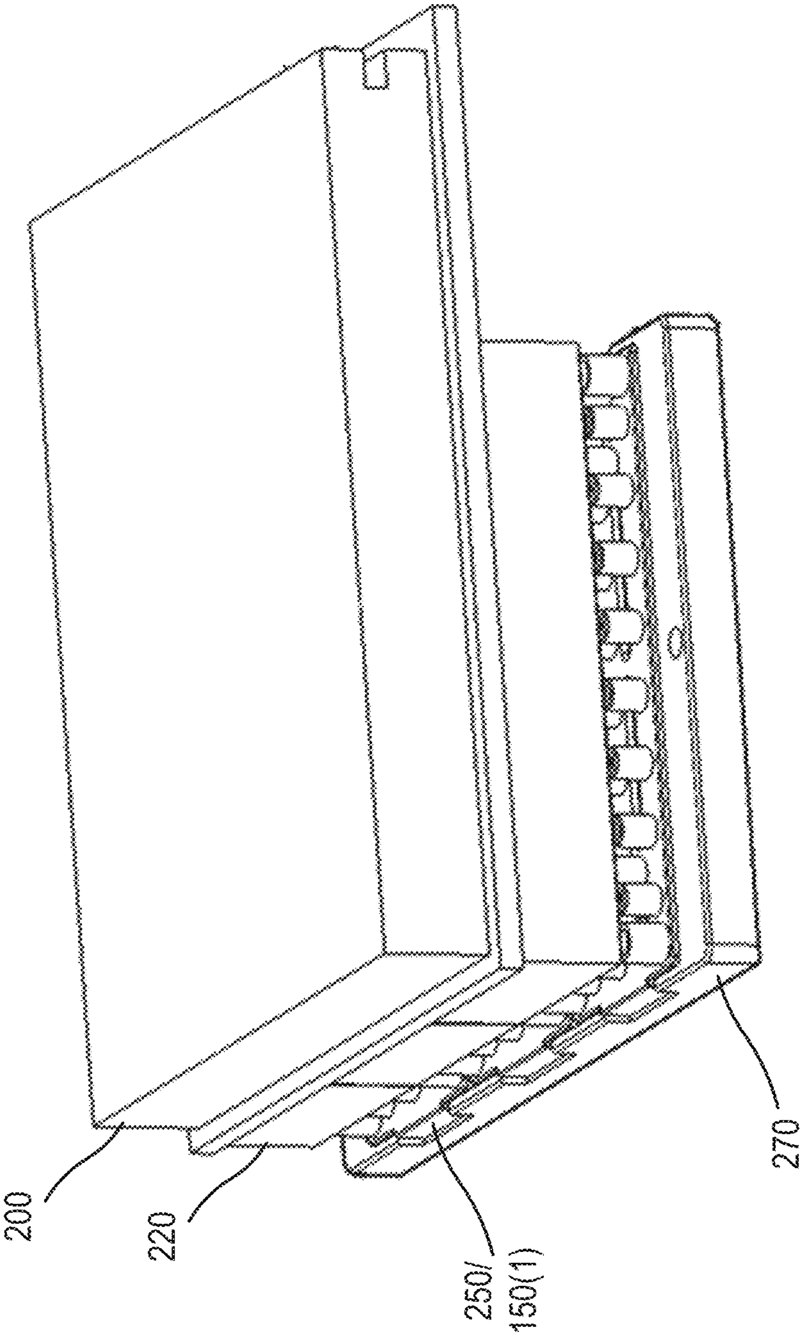
FIG. 12 is a perspective view illustrating an arrangement that includes the components of FIGS. 10 and 11.
Figure 13:
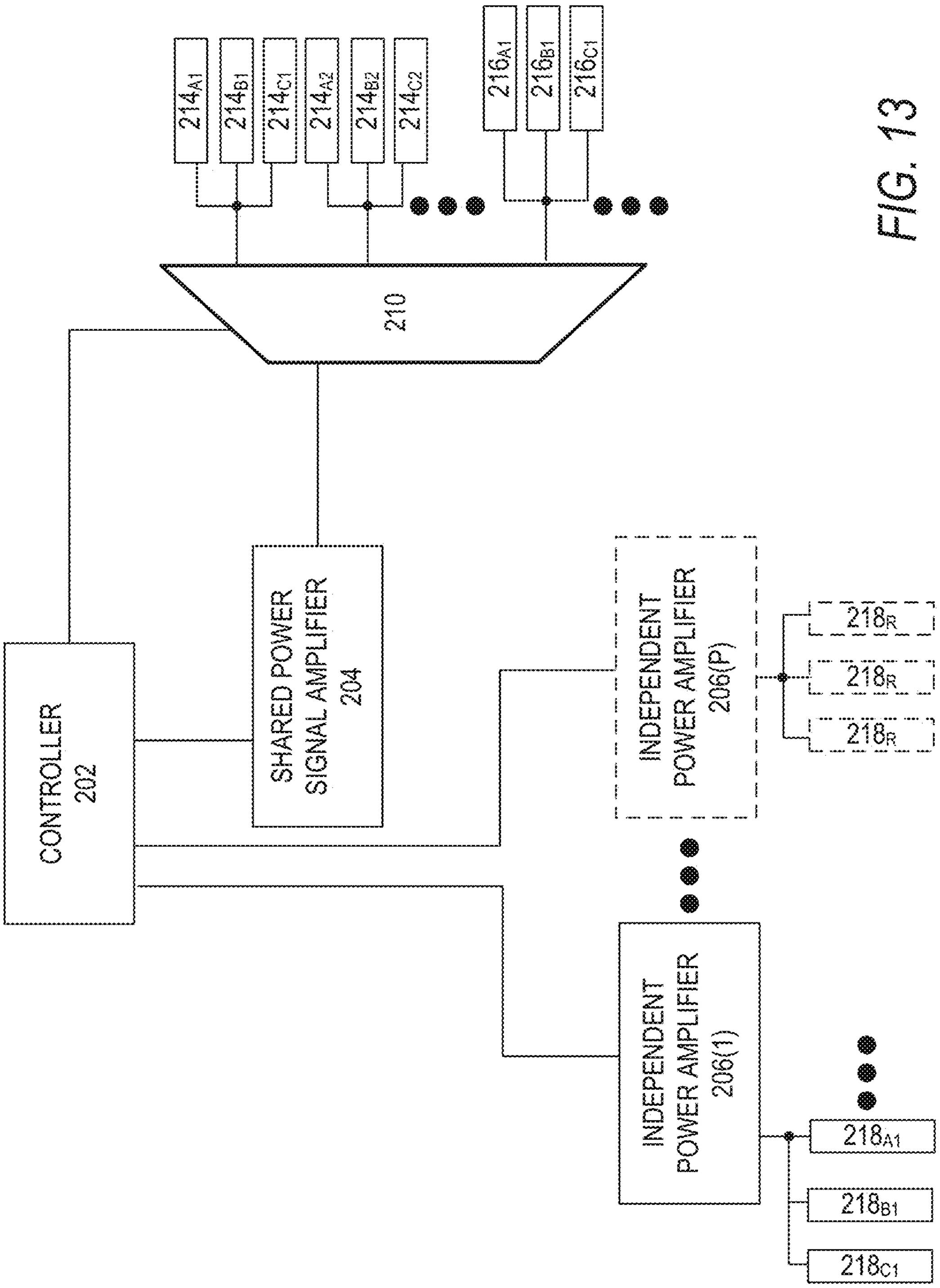
FIG. 13 is a block diagram of components of the electrical interface of FIG. 10 according to aspects of the present disclosure.

It is to be understood that the arrangement of, e.g., FIGS. 2A and 2B is merely one example, and that additional parallel processing of samples may be provided in accordance with aspects of the present disclosure. For example, FIG. 10 is a bottom view of an electrical interface 200 according to aspects of the present disclosure. FIG. 11 is a perspective view of an example of a plurality of microfluidics chips (or a single larger microfluidics chip) according to aspects of the present disclosure that may be used in conjunction with the microfluidics chip interface of FIG. 10. FIG. 12 is a perspective view illustrating a microfluidic system 230 that includes the components of FIGS. 10 and 11. FIG. 13 is a block diagram of components of the electrical interface 200 of FIGS. 10 and 120 according to aspects of the present disclosure. Although not shown, aspects of FIGS. 10-13 may be used in conjunction with the microfluidics chip 150' of FIG. 5D.

The electrical interface 200 may include a plurality of sets (designated in FIGS. 10 and 13 as A, B, and C) of electrodes, each set corresponding to FIGS. 2A and 2B and hence each set corresponding to a plurality of wells of a microfluidics chip 150. Although three sets are designated in FIGS. 10 and 13, other numbers of sets may be provided in accordance with the inventive concepts disclosed herein.

Each set of electrodes may include a plurality of electrodes 214, 216, 218. The plurality of electrodes may include sample electrodes 214, which may correspond respectively to sample wells of the microfluidics chip. For example, there may be 96 sample wells in the microfluidics chip (grouped into three sets of 32 sample wells each), and there may be a respective set of 96 sample electrodes 214. The plurality of electrodes may include ladder (reference) electrodes 216, which may correspond respectively to ladder wells of the microfluidics chip. For example, there may be 6 ladder wells in the microfluidics chip (grouped into three sets of 2 ladder wells each), and there may be a respective set of 6 ladder electrodes 216. Other wells (e.g., reagent wells, wells coupled to separation channels, waste wells, or the like) may be present in the microfluidics chip, and the plurality of electrodes may have other electrodes 218 that correspond respectively to the other wells. As discussed above, each of the plurality of electrodes 214, 216, 218 may comprise a galvanic contact surface configured to contact an electrical contact of the microfluidic chip. In some embodiments, the plurality of electrodes 214, 216, 218 may include one or more of pogo pins, sliding contacts, wires, and/or probes. The plurality of electrodes 214, 216, and 218 may be grouped into first electrodes comprising the sample electrodes 214 and the ladder electrodes 216, and second electrodes comprising the other electrodes 218, although the present disclosure is not limited thereto.

The arrangement of electrodes 214, 216, and 218 of FIG. 10 may be used in conjunction with a plurality of microfluidics chips 150 (or a single larger microfluidics chip 250), as seen in FIG. 11. A plate holder 270 may include a plurality of grooves or slots 271 therein, with each groove or slot 271 configured to receive a respective microfluidics chip 150. In some embodiments, the microfluidics chips 150 (or single larger microfluidics chip 250) may be integrated into the plate holder 270.

Referring to FIG. 13, the electrical interface 200 may be similar to the electrical interface 100 described previously, and include a controller 202, at least one shared power signal generator 204, at least one independent power signal generator 206, a plurality of electrodes 214, 216, and 218, and at least one selector 210 coupled to the shared power signal generator 204 and between the at least one selector 210 and some of the plurality of electrodes 214, 216. In some embodiments, the controller 202, the shared power signal generator 204, the independent power signal generator 206, and selector 210 may be within a housing 212, although in some embodiments one or more of the components may be outside of the housing 112.

The microfluidic system 230 may have a plurality of microfluidic chips 150 having a plurality of wells (e.g., sample wells 154, ladder wells 156, and other wells 158) with respective galvanic contacts 163 in upper surfaces thereof. A plurality of electrodes (e.g., sample electrodes 114, ladder electrodes 116, and other electrodes 118) may be provided as part of an electrical interface 200. Each electrode may be configured to contact a respective one of the galvanic contacts of the microfluidic chip 150. One or more shared power amplifiers 204 and independent power amplifiers 206 may be provided as part of the electrical interface, each configured to output a respective power signal. A selector 210 that is part of the electrical interface 100 may be configured to receive a power signal from the shared power amplifier 104 and configured to output the received power signal to a selected at least one of the plurality of electrodes. In some embodiments, the received power signal may be output to a plurality of electrodes, each corresponding to a respective microfluidic chip 150. At least one other electrode on at least one of the microfluidics chips 150 may be configured to receive a power signal output by the independent power amplifier 206.

The power amplifiers 204 and 206 may output high voltage signals (e.g., on the order of −4000 Volts to 4000 Volts), and by creating different constant voltage, constant current, and/or pulsed power signals, may accomplish electrokinetic separation for each sample.

The present inventive concepts have been described above with reference to the accompanying drawings. The inventive concepts are not limited to the illustrated embodiments; rather, these embodiments are intended to fully and completely disclose the inventive concepts to those skilled in this art. In the drawings, like numbers refer to like elements throughout. Thicknesses and dimensions of some elements may not be to scale.

Spatially relative terms, such as “under,” “below,” “lower,” “over,” “upper,” “top,” “bottom” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “under” or “beneath” other elements or features would then be oriented “over” the other elements or features. Thus, the exemplary term “under” can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression “and/or” includes any and all combinations of one or more of the associated listed items.

It will be appreciated that aspects of all embodiments disclosed herein may be combined in different ways to provide numerous additional embodiments. Thus, it will be appreciated that elements discussed above with respect to one specific embodiment may be incorporated into any of the other embodiments, either alone or in combination.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts.

What is claimed is:

1. An electrophoresis device comprising:

a plurality of electrodes each comprising a galvanic contact surface configured to contact a respective contact of a microfluidic chip;

a shared power amplifier configured to output a selected first power signal; and a selector configured to receive the first power signal from the shared power amplifier and configured to output the received power signal to a selected one or more of the plurality of electrodes, wherein the shared power amplifier is configured to output high-voltage signals, and wherein the electrodes are encapsulated in an insulator block that galvanically isolates the electrodes.

2. The electrophoresis device of claim 1, wherein the plurality of electrodes is a plurality of first electrodes, the electrophoresis device further comprising at least one independent power amplifier configured to output a selected second power signal to at least one second electrode that is separate from the plurality of first electrodes.

3. The electrophoresis device of claim 1, wherein the shared power amplifier is configured to output a selected one of a constant current power signal, a constant voltage power signal, or a pulsed power signal as the first power signal.

4. The electrophoresis device of claim 1, wherein the plurality of electrodes comprises a plurality of sample electrodes and a plurality of ladder electrodes, and wherein the selector comprises outputs corresponding in number to a sum of a number of the plurality of sample electrodes and a number of the plurality of ladder electrodes.

5. The electrophoresis device of claim 1, wherein the electrodes are arranged in a format corresponding to a Society for Biomolecular Screening (SBS) plate format.

6. The electrophoresis device of claim 5, wherein the SBS plate format is a 96 well plate format.

7. The electrophoresis device of claim 5, wherein the SBS plate format is a 384 well plate format.

8. The electrophoresis device of claim 1, wherein the plurality of electrodes has between 5 and 500 electrodes.

9. The electrophoresis device of claim 8, wherein the plurality of electrodes has between 6 and 300 electrodes.

10. The electrophoresis device of claim 9, wherein the plurality of electrodes has 126 electrodes.

11. The electrophoresis device of claim 1, further comprising an electro-mechanical assembly configured to move the plurality of electrodes into contact with the respective contacts of the microfluidic chip.

12. The electrophoresis device of claim 1, wherein the contacts of the microfluidic chip comprise conductive eyelets, and wherein the electrodes are configured to contact at least a portion of the respective conductive eyelet.

13. The electrophoresis device of claim 1, wherein the electrodes comprise pogo pins.

14. The electrophoresis device of claim 1, wherein the electrodes comprise sliding contacts.

15. The electrophoresis device of claim 1, wherein the electrodes comprise wires.

16. The electrophoresis device of claim 1, wherein the electrodes comprise probes.

17. An electrophoresis device comprising:

a plurality of first electrodes each comprising a galvanic contact surface configured to contact a respective contact surface of a microfluidic chip;

at least one second electrode separate from the plurality of first electrodes and comprising a galvanic contact surface configured to contact a respective contact surface of the microfluidic chip;

a first power amplifier configured to output a selected one of a constant current power signal, a constant voltage power signal, or a pulsed power signal as a first power signal;

a selector configured to receive the first power signal from the first power amplifier and configured to select at least one of the plurality of first electrodes and output the received first power signal thereto; and a second power amplifier configured to output to the at least one second electrode a selected one of a constant current power signal, a constant voltage power signal, or a pulsed power signal that differs from the output of the first power amplifier as a second power signal, wherein the first power amplifier and the second power amplifier are each configured to output high-voltage signals, and wherein the plurality of first electrodes and the at least one second electrode are encapsulated in an insulator block that galvanically isolates the electrodes.

18. The electrophoresis device of claim 17, wherein the selector comprises outputs corresponding in number to a number of the plurality of first electrodes.

19. An electrophoresis device comprising:

a plurality of electrodes arranged corresponding to a Society for Biomolecular Screening (SBS) plate format, each comprising a galvanic contact surface configured to contact a respective contact surface of a microfluidic chip having sample wells arranged in the SBS plate format;

first and second power amplifiers each configured to output different ones of constant current power signals, constant voltage power signals, or pulsed power signals; and a selector configured to receive a power signal from the first power amplifier and configured to select at least one of the plurality of electrodes and output the received power signal thereto, wherein the first and second power amplifiers are each configured to output high-voltage signals, and wherein the electrodes are encapsulated in an insulator block that galvanically isolates the electrodes.

* * * * *